United States Patent [19]

Malek

[11] Patent Number: 4,711,998

[45] Date of Patent: Dec. 8, 1987

[54] DIRECTION FINDER SYSTEM WITH MIRROR ARRAY

[75] Inventor: Fritz J. Malek, Santa Barbara, Calif.

[73] Assignee: Santa Barbara Research Center, Goleta, Calif.

[21] Appl. No.: 804,720

[22] Filed: Dec. 5, 1985

[51] Int. Cl.$^4$ ............................................. G01B 11/26
[52] U.S. Cl. ................................. 250/203 R; 356/152
[58] Field of Search ................ 250/203 R, 203 S, 216; 356/141, 152

[56] References Cited

U.S. PATENT DOCUMENTS 3,224,709 12/1965 Blizard ............................ 250/203 R
3,293,440 12/1966 Mueller ........................... 250/203 R Primary Examiner—Edward P. Westin Attorney, Agent, or Firm—Ronald L. Taylor; A. W. Karambelas

[57] ABSTRACT

A direction finding system for infrared radiation includes a set of three detectors uniformly positioned in an XY plane about the Z axis of a cartesian coordinate system with individual ones of the detectors having radiation detection surfaces being normal to the Z axis. A set of three mirrors have front and back reflecting surfaces which are parallel to the Z axis, the mirrors being uniformly distributed among the detectors. Signals of the detectors have magnitudes dependent on the sum of direct radiation and radiation reflected by adjoining mirrors. The detector signals are fed into computer storage to permit computation of the direction of a source of radiant energy relative to the Z axis based on a ratio of magnitudes of the signals of the detectors.

5 Claims, 5 Drawing Figures

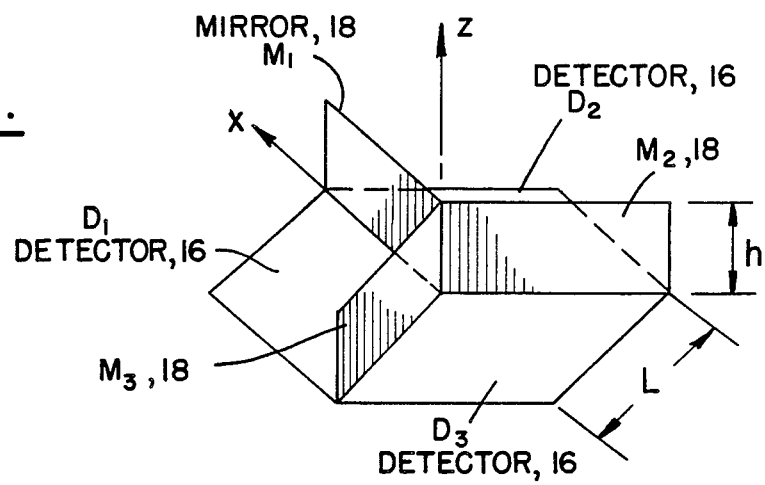
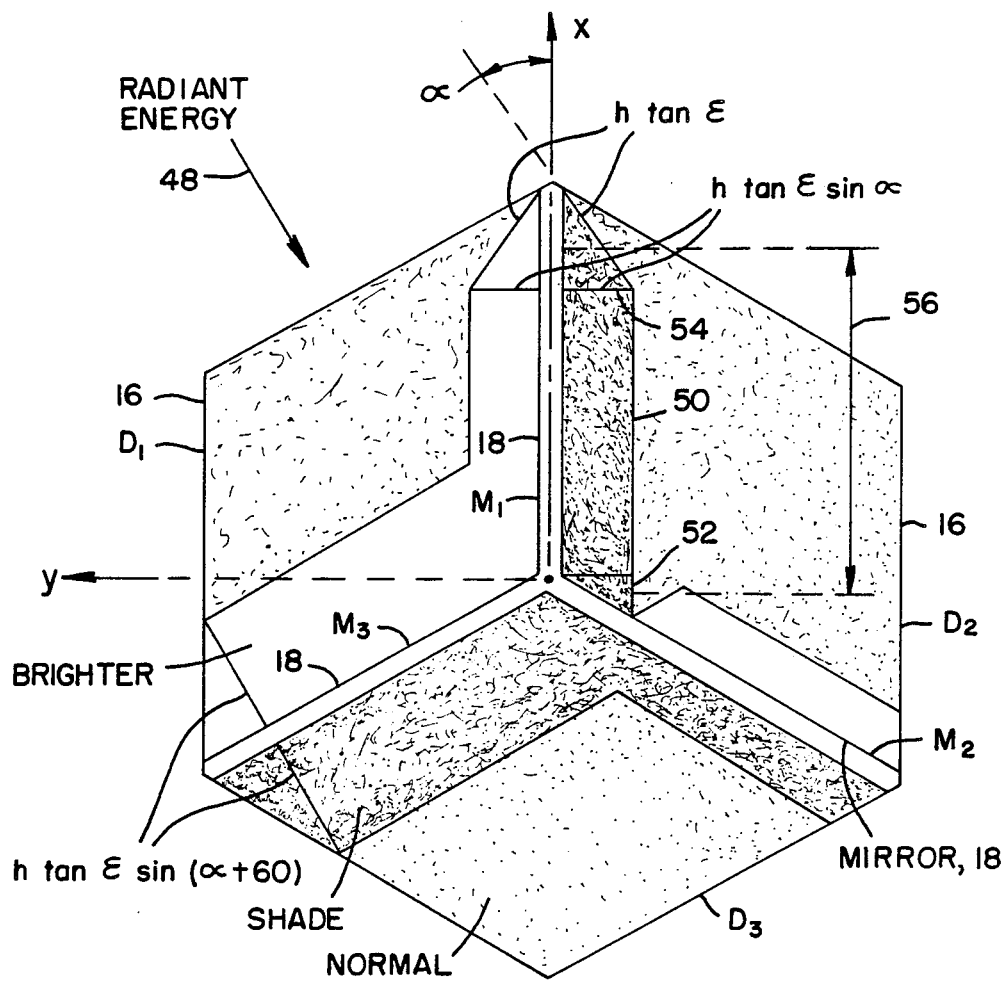

DIRECTION FINDER SYSTEM WITH MIRROR ARRAY

BACKGROUND OF THE INVENTION

This invention relates to systems for finding the direction to a source of radiant energy and, more particularly, to a system employing three coplanar detectors of infrared radiation with a set of three double-sided mirrors upstanding from the set of detectors for finding the direction to an infrared source.

Direction finding equipment has been used for many years in a variety of situations such as in the locating of a source of distress signals at sea, the monitoring of unauthorized electromagnetic transmissions, and in military operations for the locating of an enemy threat. Direction finding apparatus operates in different parts of the electromagnetic spectrum, and employs detectors of electromagnetic radiation which are specialized for the portions of the spectrum being employed.

Of particular interest herein is the detection of radiation in the infrared portion of the electromagnetic spectrum, and the determination of the direction of a source of the radiation. Imaging systems operating with infrared radiation employ arrays of detectors wherein one such array employs many detectors, possibly over 100 detectors. Such arrays are scanned across a subject and produce a well-defined image wherein the directions to points of the image are well-defined.

A problem arises in the case of direction finding equipment for the infrared portion of the electromagnetic spectrum in that the use of scanning arrays would be overly complex and provide far more data than is required for the establishment of a direction to a source of radiation. In addition, such scanning arrays typically view a relatively small sector of space and, therefore, would have limited utility in a direction finding environment.

SUMMARY OF THE INVENTION

The foregoing problem is overcome and other advantages are provided by a direction finder system which, in accordance with the invention, requires no more than three detectors of radiant energy and a set of three mirrors plus electronic circuitry coupled to the detectors for the determination of the direction of a source of radiation. The system is particularly simple in its construction in the optical components such as lenses and mirrors are not required.

A preferred embodiment of the system employs infrared detectors. However, it is to be understood that the invention is not limited to the infrared (IR) portion of the spectrum, and may be employed, for example, in the UV (ultraviolet) portion as on a laser warning system which requires a direction finder covering not only the IR region of the spectrum but also the visible and the UV. In general, the invention is applicable whenever the wavelength of the radiation of interest is short as compared to the dimensions of the detectors (or of the entrance pupil of the optical system in front of the detector) so that diffraction does not impair the desired accuracy.

Each of the detectors is characterized by a responsivity to incident radiation wherein the detector outputs an electric signal which varies in magnitude in accordance with the orientation of a wavefront of the radiation relative to a normal to a detection surface of the detector. The three detectors are arranged symmetrically about a central axis and have radiation detection surfaces which are disposed in a common plane normal to the central axis. Each of the mirrors has a reflecting surface on the front side and on the back side of the mirror. The mirrors are positioned between the detectors and are upstanding from the plane of the detectors. Radiation from a source located on the axis or angled thereto emits radiation towards the array of detectors and mirrors. It is assumed that the distance to the source is very much greater than the size of the array so that a wavefront of radiation may be viewed as a substantially flat planar surface.

In the foregoing arrangement of the mirrors, each of the mirrors is oriented at a different direction about the central axis of the array. The incoming wavefront is incident upon the mirrors and the detection surfaces of the detectors at differing angles of incidence. A detector receives both direct radiation and radiation reflected from a mirror. Therefore, the detectors output differing signal amplitudes in accordance with the differing angles of incidence of the sum of the direct and the reflected radiation upon each of the detectors. The detector signals are combined in electronic circuitry which calculates the direction to the source of radiation. The calculation is made in accordance with a preset algorithm. An advantage of the invention is the simplicity with which a large field of view can be obtained.

BRIEF DESCRIPTION OF THE DRAWING

The foregoing aspects and other features of the invention are explained in the following description, taken in connection with the accompanying drawing wherein:

FIG. 2 is a diagrammatic isometric view of the array of detectors and mirrors of FIG. 1 and includes axes of a cartesion coordinate system for describing a direction of radiation from the source;

FIG. 5 is a diagrammatic plan view of the array of detectors showing shading provided by mirrors upstanding between the detectors, and mathematical expressions for calculating areas of shading and reflected illumination.

DETAILED DESCRIPTION

Figure 1:
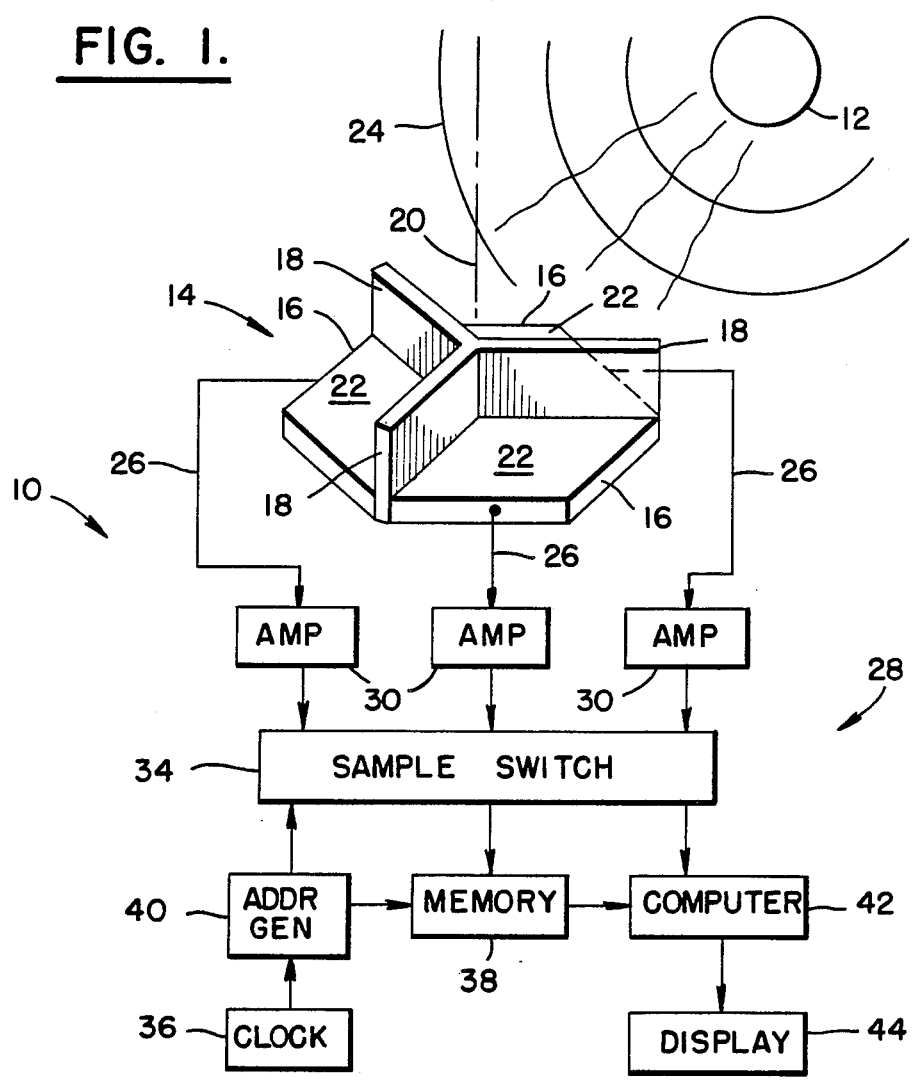
FIG. 1 is a diagrammatic view of an array of infrared detectors and mirrors, the figure also including a block diagram of electronic circuitry coupled to the detectors for calculation of the direction of a source or radiation in accordance with the invention.

With reference to FIG. 1, there is shown a system 10 which is constructed in accordance with the invention for finding the direction of a source 12 of infrared radiation. The system 10 includes an array 14 of three detectors 16 of infrared radiation and three mirrors 18. The detectors 16 are arranged symmetrically in a common plane about a central axis 20 of the array 14. Each of the detectors 16 has a planar radiation receiving surface 22, a normal to the surface 22 being parallel to the central axis 20. The mirrors 18 are disposed symmetrically about the axis 20 and are positioned between the detectors 16, the set of mirrors 18 and the set of detectors 16 constituting a unitary assembly. Each of the mirrors 18 has two reflecting surfaces located on front and back sides of the mirror 18 for directing radiation respectively to detectors 16 positioned before and behind the mirror 18. The mirrors 18 lie in planes which intersect at and include the central axis 20. Radiation emitted by the source 12 develops wavefronts 24 which may be regarded as being substantially planar in the vicinity of the array 14 because the distance between the source 12 and the array 14 is presumed to be very much greater than the size of the array 14.

The detectors 16 may be formed with a well-known structure, including photovoltaic material which converts incident infrared radiation to an electric signal, the electric signal being outputted via a line 26 from each of the detectors 16. The responsivity of a detector 16 is dependent on the angle of incidence of the sum of direct and reflected components of a wavefront 24 upon the surface 22.

Electronic circuitry 28 connects to the detectors 16 for combining their output signals to determine the direction of the source 12 relative to the axis 20. The circuitry 28 comprises four amplifiers 30, a sampling switch 34, a clock 36, a memory 38, an address generator 40, a computer 42, and a display 44.

In operation, the amplifiers 30 connect with the detectors 16 via the lines 26 and amplify the detector output signals to a suitable level for operating components of the circuitry 28. The amplifiers 30 may include well-known bandpass filters (not shown) for tuning the amplifiers 30 to the signal modulation frequency of the incident radiation from the source 12, the passbands of the filters being selected to equal the anticipated bandwidth of the signal from the source 12.

As will be taught hereinafter with respect to an algorithm employed by the computer 42 in computing the direction of the source 12, such computation is based on the relative amplitudes of signals outputted by the detectors 16. In the implementation of such computation, normalization of the signals of the respective detectors 16 is accomplished automatically by virtue of the fact that formulas of the computation employ only ratios of signals of the detectors 16.

The signals of the amplifiers 30 are applied to the switch 34. The switch 34 is operated by an address signal provided by the generator 40 in response to clock pulses supplied by the clock 36. The address generator 40 applies a repeating sequence of addresses to the switch 34 to repetitively and sequentially sample signals of the amplifiers 30, and to apply samples of the amplifier signals to the memory 38. The memory 38 is also addressed by the generator 40 for receiving the signal samples from the switch 34. The stored signal samples in the memory 38 constitute data of the wavefront 24, which data is employed by the computer 42 to compute the direction of the source 12. The direction of the source 12 is outputted by the computer 42 for presentation on the display 44.

Figure 3:
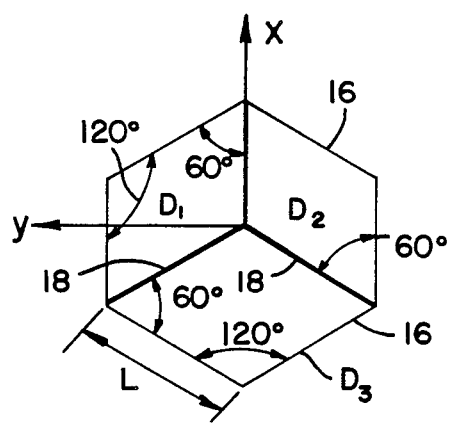
FIG. 3 shows a top plan view of the array of FIG. 2 with reference to a cartesian coordinate system for describing the direction of radiation from the source.
Figure 4:
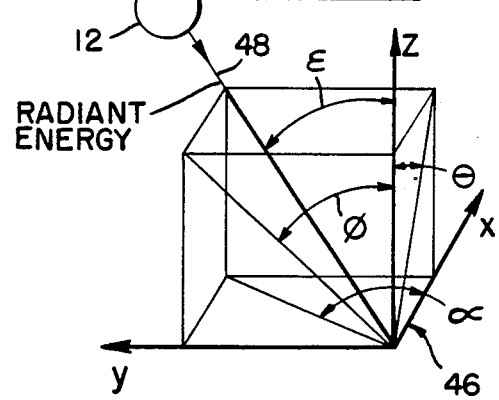
FIG. 4 shows diagrammatically angles of inclination used for describing the direction of incident radiation relative to the coordinate system of FIG. 3.

With reference also to FIGS. 2, 3 and 4, the array 14 is positioned on the XY plane of a cartesian coordinate system 46 with the Z axis coinciding with the axis 20 of FIG. 1. Individual ones of the detectors 16 and of the mirrors 18 are further identified by legends $D_1$, $D_2$, $D_3$ and M, $M_2$, $M_3$, respectively to facilitate the ensuing description. The plane of one of the mirrors 18 lies along the X axis. A ray 48 of radiation is shown as a vector and represents a direction of propagation of an incoming electromagnetic wave.

As shown in FIG. 3, the ray 48 is directed towards the origin of the coordinate system 46. The direction of the ray 48 is defined by two angles of inclination, one angle of inclination being designated as ($\phi$) in the YZ plane, and the second angle of inclination being identified as the angle ($\theta$) in the XZ plane. These two angles are measured relative to the Z axis.

In the operation of the computer 42, the following two equations (or algorithms) are employed by the computer 42 to provide values for the angles $\theta$ and $\phi$, namely:

$$\phi = \arctan\left[\left(\frac{\sqrt{3}}{2}\right) \frac{L(S_1 - S_2)}{h(S_1 + S_2 + S_3)}\right] \quad (1)$$

$$\theta = \quad (2)$$

$$\arctan\left[\frac{L}{h} - \frac{L}{h}\sqrt{\left(\frac{1}{4}\right)\frac{S_1 - S_2}{S_1 + S_2 + S_3}2 + \frac{3S_2}{S_1 + S_2 + S_3}}\right]$$

wherein h is the height of a mirror 18 from the plane of the detectors 16, and L is the length of a side of a detector 16 as is shown in FIG. 2. The detectors 16 are of equal size, each of the detectors 16 having the shape of a rhombus wherein an acute angle is 60° and an obtuse angle is 180°. The mirrors 18 are of equal size, each of the mirrors 18 having the shape of a rectangle in a preferred embodiment of the invention. The terms $s_1$, $s_2$, and $s_3$ represent strengths of the signals outputed by correspondingly numbered ones of the detectors 16.

The foregoing expressions are readily implemented by the computer 42 to provide the values $\theta$ and $\phi$ based on values of the detector signals. The values of $\theta$ and $\phi$ are applied to the display 44 for indicating the direction of the source 12 relative to the central axis 20 of the array 14.

The values of $\theta$ and $\phi$, as set forth in the foregoing mathematical expressions, are based on the geometry of the array 14, and the orientations of the detectors 16 and mirrors 18 relative to an incident ray of radiation from the source 12.

With reference to FIG. 5, a ray 48 is incident upon the array 14 from the upper left quadrant of the drawing to impinge fully upon the detector $D_1$, while only partially illuminating the detectors $D_2$ and $D_3$ due to a shading of the radiation by the mirrors 18. Shading, normal illumination and brighter regions are indicated by shaded areas in the drawing. Both the mirrors $M_1$ and $M_3$ reflect radiation onto the detector $D_1$ for increased output signal from the detector $D_1$. The detector $D_3$ outputs a minimum value of signal because of the shading by mirrors $M_2$ and $M_3$. The detector $D_2$ outputs a moderate amount of singal because it is shaded by the mirror $M_1$ and provided with additional illumination reflected by the mirror $M_2$.

The responsivities of the respective detectors 16 depend on the total illumination, both direct and reflected, whereby each detector 16 outputs a different signal than the other detectors 16. The output signals are equal in amplitude only for the case of normal incidence along the z axis. Variations in signal amplitude among the detectors 16 are indicative of the direction of incident radiation. Computations by the computer 42 employing the equations (1) and (2) give the desired angles of orientation because the equations have been derived in terms of relative illumination of the respective detectors 16.

The derivation of equations (1) and (2) is now explained in terms of the orientations of the detectors 16 and mirrors 18 relative to the ray 48, which orientations determine the relative amounts of illumination of the detectors 16. In FIG. 4 four angles are used to describe the orientation of the ray 48. These angles are azimuth $\alpha$, incidence $\epsilon$ relative to a normal (the z axis) to the array 14, the component of incidence $\theta$ in the XZ plane, and the component of incidence $\phi$ in the YZ plane. $\phi$ and $\theta$ appear in equations (1) and (2) and are related to $\epsilon$ and $\alpha$ as follows:

$$\tan \phi = \tan \epsilon \sin \alpha \quad (3)$$

$$\tan \theta = \tan \epsilon \cos \alpha \quad (4)$$

The shaded and brightened areas of FIG. 5 can be described mathematically in thermal of the height h of each of the mirrors 18 and the length L of each of the mirrors 18 with the angles $\epsilon$ and $\alpha$ the angles of 60° and 120° between sides of individual ones of the detectors 16. Specific dimensions of the shaded and brightened regions of the array 14 are described by mathematical expressions, shown in FIG. 5, in terms of the foregoing parameters.

In FIG. 5, the length of a shadow cast across the detector $D_2$ of the mirror $M_1$ is shown as $$h \tan \epsilon \quad (5)$$

By symmetry, the corresponding edge of the brightened region in the detector $D_1$ has the same length, the edge of the brightened region being illuminated by rays reflecting from the end portion of the mirror $M_1$. The width of the shadow on one side of the mirror $M_1$ and of the brightened region on the other side of the mirror $M_1$ are equal to $$h \tan \epsilon \sin \alpha \quad (6)$$

The corresponding areas of the shaded and brightened regions alongside the mirror $M_1$, and also the areas of the corresponding regions alongside the mirrors $M_2$ and $M_3$, are given by the product of the width times the effective length. Where an and portion of such region is triangular, only have the length of the triangular portion is employed in calculation of the area of the region.

By way of example, a shaded region 50 cast by the mirror $M_1$ upon the detector $D_2$ has a triangular end portion 52 and a second triangular end portion 54. The length 56 of the region 50, for purposes of calculating the area of the region, extends from the center of a base of the triangular portion 52 to the center of a base of the triangular portion 54.

By assuming that a shaded region has none of the radiant energy from the source 12, and that a brightened region has double the intensity of the radiant energy, the signal strength outputted by any one of the detectors 16 is equal, apart from a scale factor, to the algebraic sum S of the detector area A plus the area of a brightened region minus the area of a shaded region.

The following relationships are obtained for each of the detectors 18. For the detector $D_1$, the sum $S_1$ is given by $$S_1 = A + Lh \tan \epsilon[\sin \alpha + \sin (60° + \alpha)] - h^2(\tfrac{1}{2}) \tan^2 \epsilon$$
$$\sin^2 (60° + \alpha)[\tan 30° + \tan (30° - \alpha)] \quad (7)$$

which can be simplified to $$S_1 = A + (3/2) Lh \tan \epsilon \left( \sin \alpha + \left( \frac{1}{\sqrt{3}} \right) \cos \alpha \right) - \quad (8)$$

$$h^2 \left( \frac{\sqrt{3}}{4} \right) \tan^2 \epsilon (\cos^2 \alpha - (1/3)\sin^2 \alpha)$$

The corresponding relationship for the detector $D_2$ is given by:

$$S_2 = A - Lh \tan \epsilon[\sin \alpha - \sin (60° - \phi)] - (\tfrac{1}{2})h^2 \tan^2 \epsilon$$
$$\sin^2 (60° - \alpha)[\tan 30° + \tan (30° + \alpha)] \quad (9)$$

which can be simplified to $$S_2 = A + (3/2) Lh \tan \epsilon \left( -\sin \alpha + \left( \frac{1}{\sqrt{3}} \right) \cos \alpha \right) - \quad (10)$$

$$H^2 \left( \frac{\sqrt{3}}{4} \right) \tan^2 \epsilon (\cos^2 \alpha - (1/3)\sin^2 \alpha)$$

The corresponding relationship for the detector $D_3$ is given by:

$$S_3 = A - Lh \tan \epsilon[\sin(60° + \alpha) - \sin(60° - \alpha)] + \quad (11)$$

$$\left( \frac{\sqrt{3}}{2} \right) h^2 \tan^2 \epsilon (\cos^2 \alpha - (1/3)\sin^2 \alpha]$$

which can be simplified to $$S_3 = A - \sqrt{3} \, Lh \tan \epsilon \cos \alpha + \quad (12)$$

$$h^2 \left( \frac{\sqrt{3}}{2} \right) \tan^2 \epsilon (\cos^2 \alpha - (1/3)\sin^2 \alpha)$$

The values of $S_1$, $S_2$, and $S_3$ can be normalized by dividing the respective values by the total detector area of the array, namely, dividing by 3A. Due to the rhombic shape, the area A of one detector is given by $$A = L^2 \cos 30° = \left( \frac{\sqrt{3}}{2} \right) L^2 \quad (13)$$

To obtain the component of the angle of incidence in the YZ plane, namely $\phi$, the normalized difference of $S_1$ and $S_2$ is taken:

$$\frac{S_1 - S_2}{3A} = \frac{3Lh \tan \epsilon \sin \alpha}{3L^2 \cos 30°} = \left( \frac{2}{\sqrt{3}} \right) \left( \frac{h}{L} \right) \tan \epsilon \sin \alpha \quad (14)$$

wherein the expressions of equations (8), (10) and (13) have been substituted for $S_1$, $S_2$ and A. Substitution of equation (3) into equation (14) gives $$\tan\alpha = \frac{\sqrt{3}\,(S_1 - S_2)}{2(3A)}\left(\frac{L}{h}\right) \tag{15}$$

For near normal incidence, the sum of $S_1+S_2+S_3$ approximates 3A. Upon making this substitution for A in equation (15), the relationship of equation (1) is obtained.

To obtain the component of the angle of incidence in the XZ plane, namely $\theta$, the normalized value of $S_3$, namely ($S_3$3A), is taken. First equation (12) is expanded and the relationship of equation (14) is substituted therein to give $$S_3 = A - (3)Lh\tan\epsilon\cos + \tag{16}$$

$$h^2\left(\frac{3}{2}\right)\tan^2\epsilon\cos^2\alpha - \frac{L^2}{24\sqrt{3}}\frac{(S_1 - S_2)}{A^2}$$

upon dividing $S_3$ by 3A, and substituting from equation (13), and upon a further substitution from equation (4), there is obtained $$\tan\theta = \frac{L}{h} - \frac{L}{h}\sqrt{\left(\frac{1}{4}\right)\left(\frac{S_1 - S_2}{3A}\right)^2 + \frac{3S_3}{3A}} \tag{17}$$

Again, upon substituting the sum of $S_1+S_2+S_3$ for 3A in equation (17), as was done in equation (15), the relationship of equation (2) is obtained. This completes the derivation.

Thereby, the invention has accomplished a major objective of finding the direction to a source of infrared radiation by use of a relatively few number of detectors.

It is to be understood that the above described embodiment of the invention is illustrative only, and that modifications thereof may occur to those skilled in the art. Accordingly, this invention is not to be regarded as limited to the embodiment disclosed herein, but is to be limited only as defined by the appended claims.

I claim:
1. A direction finder system comprising:
an array of three radiation detectors and three mirrors disposed between the detectors, said detectors being positioned in a plane about a central axis of the array for detecting an incoming wave of radiant energy from a source of the radiant energy located in a sector of space including said central axis, each of said detectors producing a signal upon detection of an incident wave of the radiant energy;
each of said mirrors having front and back reflecting surfaces for reflection of the radiant energy upon individual ones of said detectors located before and behind the mirror, said mirrors lying in planes which intersect at and include said central axis thereby to extend forward of the plane of said detectors for interception of rays of radiation directed towards the plane of said detectors, said interception of rays by a mirror introducing a shading of one of said detectors during a reflection of radiation upon a second of said detectors;
the strength of each signal depending on the orientation of a radiation-receiving surface of the corresponding detector and the orientation of reflecting surfaces of adjoining mirrors relative to the direction of propagation of said wave, including increments in signal strength introduced by reflection and shading functions of the mirrors; and
means for combining the signals of said detectors to obtain the direction of a source of said wave, said combining being based on a continuously variable ratio of signals of respective ones of said detectors to accomplish normalization of respective ones of the detector signals.

2. A system according to claim 1 wherein said three detectors are spaced uniformly about said central axis.

3. A system according to claim 2 wherein said central axis is normal to the radiation receiving surfaces of said detectors.

4. A system according to claim 3 wherein each of said detectors has a rhombic shape, the detectors being of equal size.

5. A system according to claim 4 wherein each of said mirrors has a rectangular shape, the mirrors being of equal size.

* * * * *